Figure 1:
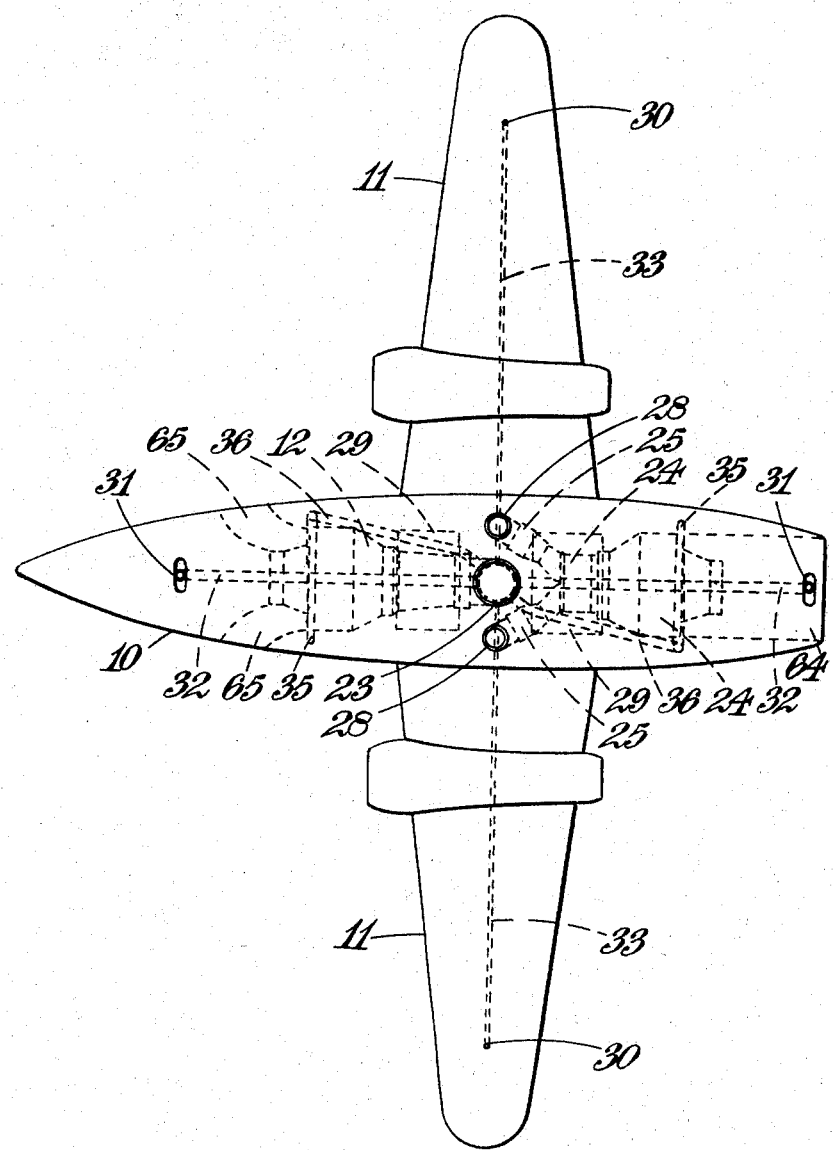

United States Patent Office 2,870,978
Patented Jan. 27, 1959

2,870,978
CONTROLS FOR AIRCRAFT

Alan Arnold Griffith, Derby, and Alan William Thorpe, Farnborough, England; said Griffith assignor to Rolls-Royce Limited, Derby, England, a British company, and said Thorpe assignor to The Minister of Supply, in Her Majesty's Government, of the United Kingdom of Great Britain and Northern Ireland, London, England Application May 1, 1953, Serial No. 352,382

Claims priority, application Great Britain May 1, 1952

6 Claims. (Cl. 244—23)

This invention relates to aircraft and is concerned with aircraft of the hitherto proposed type (hereinafter referred to as the type specified) having gas turbine propulsion means.

It is the primary object of the present invention to provide improved means which will assist in manoeuvring the aircraft.

According to the present invention, an aircraft of the type specified comprises means to control movements of the aircraft in one or more of its senses of freedom including an auxiliary jet nozzle arrangement connected to be fed with compressed air tapped from a compressor of the gas turbine propulsion means, and means to control the air flow to said auxiliary jet nozzle arrangement to vary its thrust effect.

An important use of this invention is in manoeuvring the aircraft during take-off or landing of an aircraft whereof the gas turbine propulsion means are of the reaction propulsion type and are arranged or adapted to exert a vertical lift force on the aircraft to facilitate take-off and landing.

Preferably the auxiliary jet nozzle arrangement comprises one or more pairs of jet nozzles, each pair being effective to control movement of the aircraft in a selected sense of freedom. The jet nozzles of a pair are conveniently arranged one on each side of the centre of gravity of the aircraft and may for instance be arranged to produce a couple to control movement of the aircraft in one of the rotational senses of freedom of the aircraft.

According to an important feature of this invention, the means to control the air flow to a pair of jet nozzles may be arranged for operation so that a reduction of air flow to one auxiliary jet nozzle of the pair is accompanied by an increase of flow to the second auxiliary jet nozzle of the pair. Where the air flows to a pair of jet nozzles are adjusted to decrease one flow and increase the other, it is preferably arranged that the total flow to the two jet nozzles remains substantially constant whereby the quantity of air tapped from the compressor system of the gas turbine propulsion means remains unaltered, and also in the case of pitch and roll controls the total vertical force due to them is unchanged by their operation.

Adoption of the invention enables the rate of response in control to be independent of the rate of acceleration of gas turbine jet propulsion means, the control rate being limited only by the possible rate of movement of the compressed air controls. The latter may be operated manually or automatically by known means.

One form of aircraft fitted with means to control its manoeuvres in accordance with this invention will now be described with reference to the accompanying drawings, in which—

Figure 2:
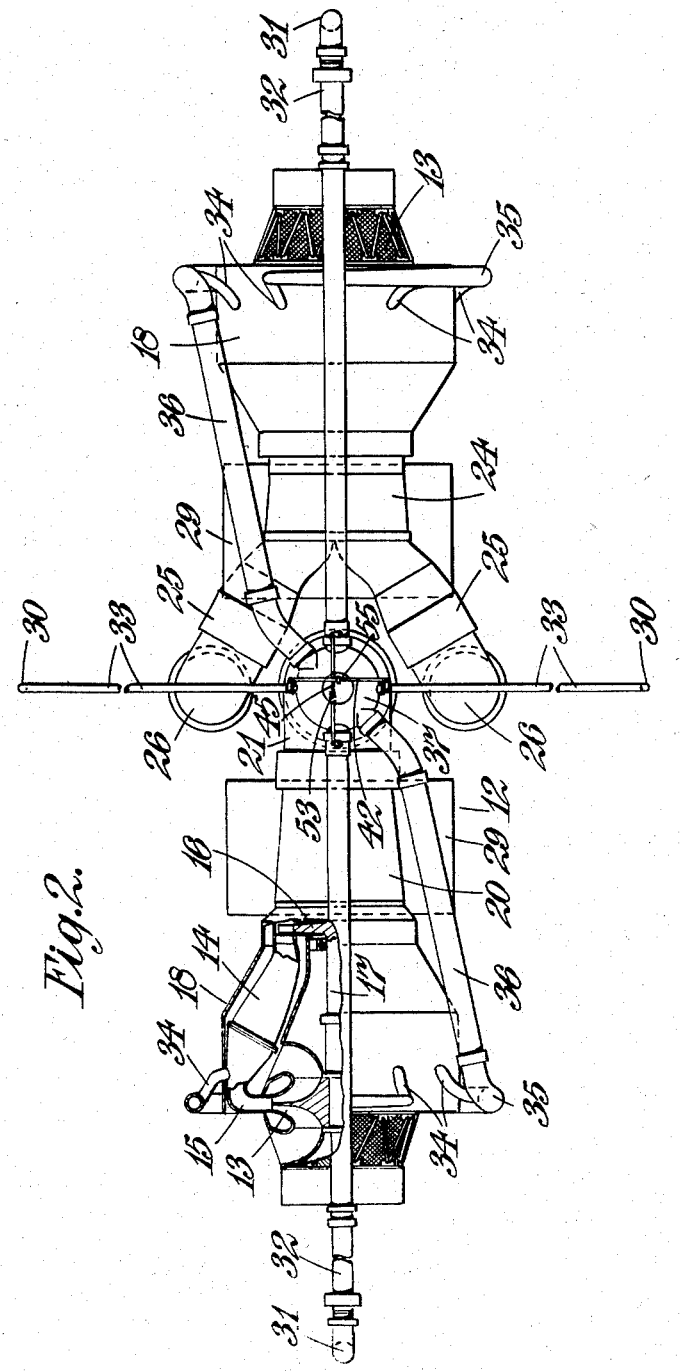
Figure 3:
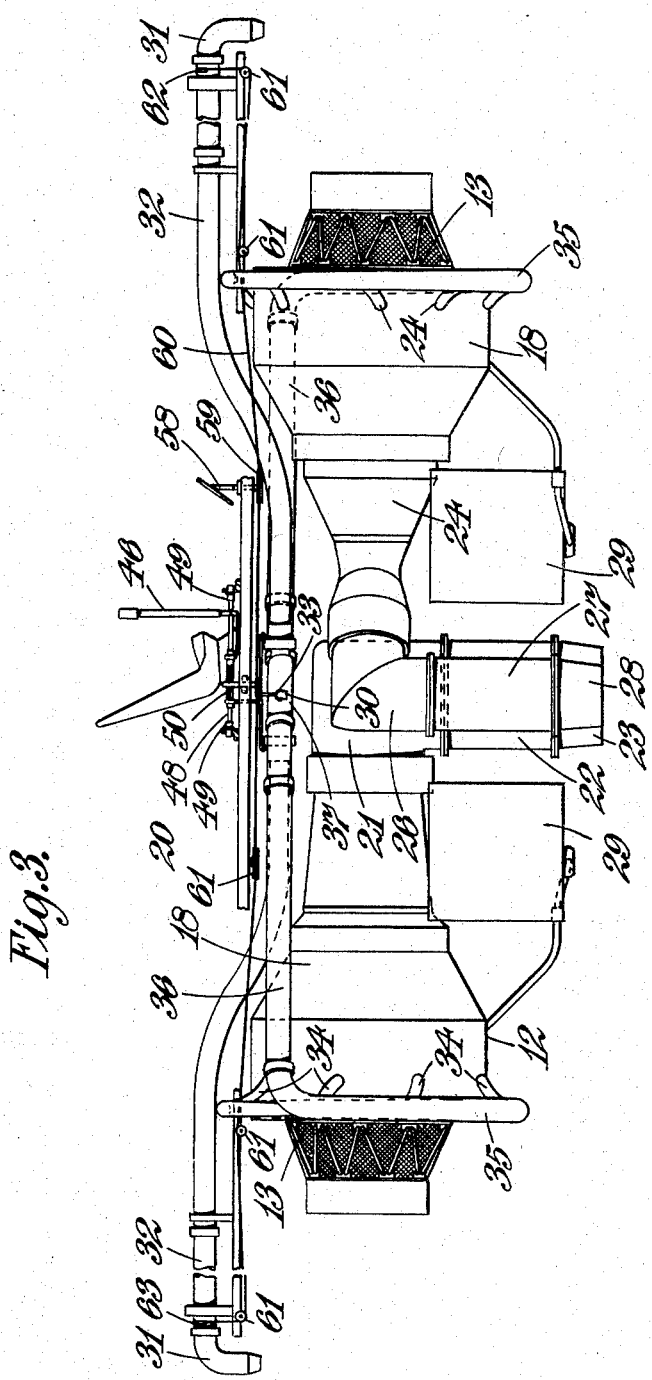
Figure 4:
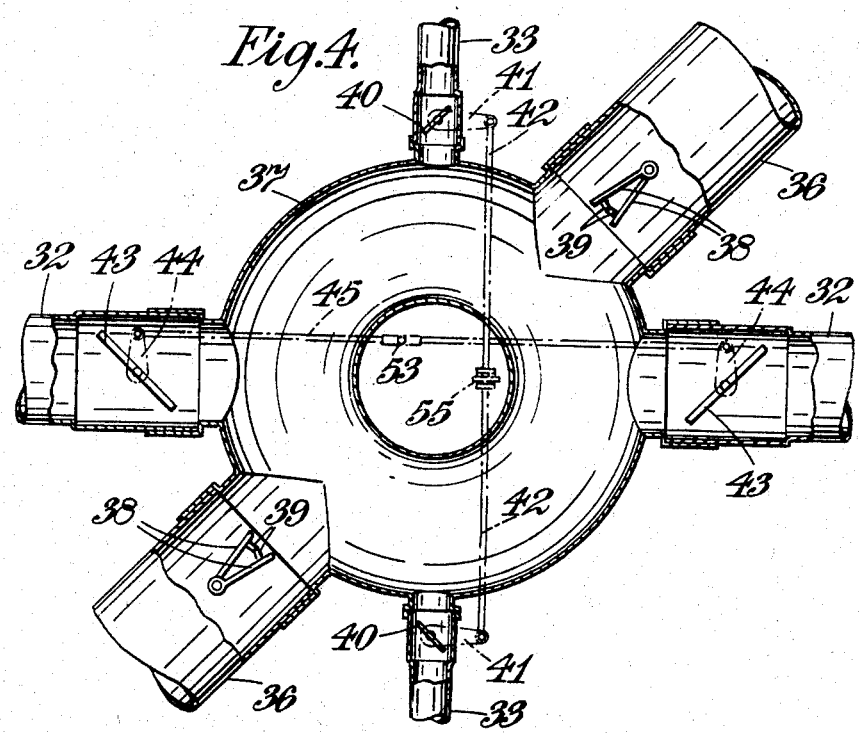
Figure 5:
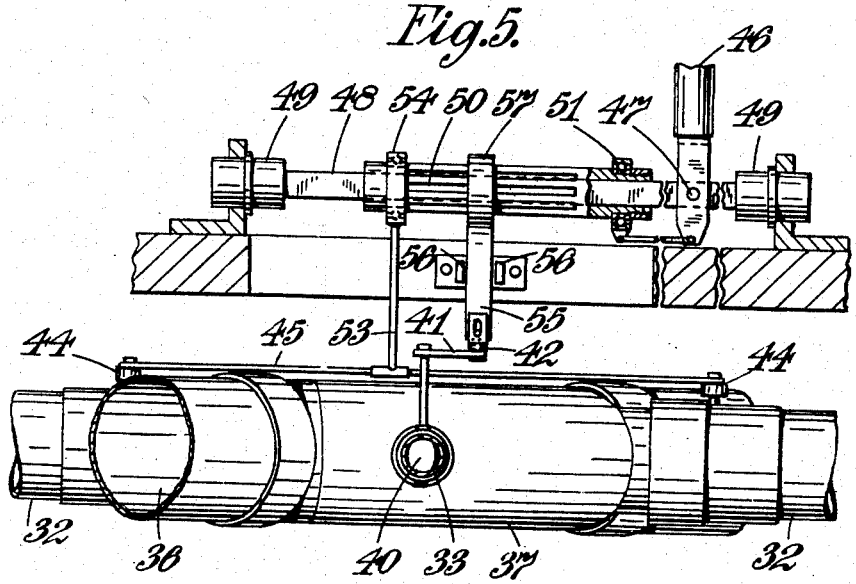

Figure 1 is an under plan of the aircraft with a power plant and control means fitted therein, Figure 2 is a top plan of the power plant and part of the control means, Figure 3 is a side view corresponding to Figure 2, Figure 4 is a detail view of part of the control means, and Figure 5 is a further detail of the control means.

Referring first to Figure 1, the aircraft is shown as having a fuselage 10 and laterally extending aerofoils 11. The aircraft also has a power plant 12 accommodated within the fuselage 10 and the power plant comprises (see more especially Figures 2 and 3) a pair of gas-turbine engines.

Each gas-turbine engine comprises a compressor 13, a series of combustion chambers 14, each fed with compressed air from the compressor by a delivery neck 15, and a turbine 16 connected by a shaft 17 to the compressor 13. Part of the compressor 13, the combustion equipment 14 and turbine are enclosed in an outer casing 18 to shield the aircraft structure from heating effects. Air intake ducts are shown at 64 and 65 for the right-hand and left-hand engines respectively.

Each engine also comprises an exhaust assembly and jet pipe arrangement. In the case of the left hand engine, the exhaust assembly is indicated at 20 and it leads exhaust gases to an elbow pipe 21 in which the exhaust gases are turned through 90° to a downwardly directed jet pipe 22 terminating in a propelling nozzle 23 opening through the underside of the fuselage 10. In the case of the right hand engine the exhaust assembly is indicated at 24 and it has a pair of outlet conduits 25 feeding exhaust gases from the engine to a pair of elbow pipes 26, one on each side of elbow 21, and thus to a pair of downwardly directed jet pipes 27 and propelling nozzles 28.

The engines are balanced about the centre of gravity of the aircraft and the centre lines of the three downwardly directed jet pipes 23, 28 are contained in a plane at right angles to the longitudinal centre line of the aircraft, which plane also contains the centre of gravity of the aircraft.

The engines provide substantial vertical thrust forces on the aircraft say during landing and take-off.

Fuel tanks for supplying fuel to the engines are indicated at 29.

Manoeuvring of the aircraft is effected by the following control means.

Two pairs of auxiliary jet nozzles are provided. The one pair of nozzles, indicated at 30, open downwardly through the under surfaces of the aerofoils 11 and control the aircraft in roll manoeuvres, and the second pair of nozzles indicated at 31 open through the underside of the fuselage in longitudinally spaced relation one on each side of the centre of gravity of the aircraft to control the aircraft in pitch manoeuvres. The nozzles 31 are arranged to swivel on the ends of their fluid supply pipes 32 and control the aircraft in yaw manoeuvres. The fluid supply pipes for nozzles 30 are indicated at 33.

The operating fluid for the nozzles 30, 31 is air compressed in the engine compressors 13, and the air is delivered to the supply pipes 32, 33 from a common distributor manifold.

Air is tapped off from each delivery neck 15 by means of a corresponding bleed pipe 34 and the bleed pipes 34 associated with each engine delivers into an associated collector scroll 35. The scrolls 35 deliver into conduits 36 and the opposite ends of the conduits open into an annular distributor manifold 37 at diametrically opposite points. The manifold 37 is arranged centrally of the power plant and is shown in detail in Figure 4. Non-return valves 38 are provided in form of pivoted flaps in the outlets ends of the conduits; abutment stops 39 are provided on the flaps 38 to prevent their coming flat together.

The manifold 37 also has connected to it the inlet ends of the supply pipes 33, 32 leading to the nozzles 30, 31, the pairs of pipes 33, 32 opening into the manifold at diametrically opposite points.

Control valves are provided in the inlets to the supply pipes 33, 32, the valves 40 in the supply pipes 33 having operating arms 41 connected together by an operating rod 42 so that as one valve 40 opens the other valve 40 closes by a corresponding amount, and the valves 43 in the supply pipes 32 having their operating arms 44 interconnected by an operating rod 45 so that as one valve 43 opens the other closes by a corresponding amount. In this way, the amount of air tapped-off from the engine is unaltered by adjusting the valves 40, 43 to manoeuvre the aircraft. It will be seen that when a pair of valves, say valves 40, are set so that they are of unequal throttling effect, a control couple is produced on the aircraft.

The setting of the valves 40, 43 may be controlled in any convenient manner as will be well understood in the art. Thus the control will usually be controlled automatically through a gyroscopic control device operating through servo mechanisms. However for simplicity a manual control is illustrated.

This manual control is illustrated in Figure 5 The pilot's control column 46 is, as is usual, mounted to be rockable both in the fore and aft direction and from side to side. The control column 46 is pivoted at 47 to a squared shaft 48 which is mounted in bearings 49 at its ends to rock about an axis at right angles to the axis of pivot 47.

The shaft 48 has slidably mounted on it an externally splined shaft 50 which is connected by a thrust collar 51 and link 52 to control column 46 so that rocking of the control column 46 about pivot 47 slides the shaft 50 along the shaft 48. The shaft 50 by its sliding displaces the rod 45 longitudinally, the rod 45 being connected to the shaft 50 by a lateral projection 53 and thrust collar 54.

The splined shaft 50 partakes of the rocking of shaft 48 about its axis and rocking of the shaft 50 is employed to displace the rod 42 longitudinally of itself. The rod 42 has a lateral projection 55 running between fixed guides 56 and the end of the projection 55 is in the form of a splined boss 57 engaged with the splines of the shaft 50.

As mentioned above the nozzles 31 swivel on their supply pipes 32 to control the aircraft in yaw manoeuvres. The swivelling of the nozzles 31 is shown as being effected by a rudder bar 58. Swivelling of the rudder bar 58 rotates a pulley 59 having attached to it a continuous cable 60 which runs from pulley 59 forwards over idler pulleys 61 to be attached to one nozzle 31 at 62 and then rearwards on the opposite side of pipe 32 over further pulleys 61 to be attached to the other side of the pulley 59. The cable 60 also runs rearwards over idler pulleys 61 to be attached to the other nozzle 31 at 63 and then back to the pulley 59. On rocking of the rudder bar 58 the one nozzle 31 is turned to, say, the right and the other is turned to the left.

Vertical ascent and descent in take-off and landing are preferably controlled by a variation of the vertical lift force on the aircraft applied by the gas turbine jet propulsion engines. Thus in the case of a pilot-controlled aircraft this vertical control can be obtained by manual selection of the vertical thrust by throttle movement.

An additional pair of auxiliary jets may be provided located either forwardly or aft of the centre of gravity, the jets being directed horizontally in opposite senses, whereby the differential adjustment of the flow causes a control couple in respect of yaw.

Further auxiliary jets may be used to control side-slip and longitudinal movement of the aircraft. Alternatively these movements may be obtained by adjusting the thrust lines of auxiliary jets provided for control in other senses of freedom, to give a horizontal component causing side-slip or longitudinal motion.

The gas-turbine engine propulsion means of the aircraft, instead of having downwardly directed jet pipes, may have jet nozzles adjustable in the aircraft structure to enable the propulsive jet to be directed in a manner to produce horizontal flight or to produce a vertical lift force on the aircraft, or the propulsion means may comprise means to divert the gas stream of a propulsive jet to provide such vertical lift force, or may comprise both the propulsion means adjustable to produce the vertical lift force and the means to divert a propulsive jet. Aircraft structures including air-consuming reaction propulsion engines having provision for diverting the propulsive jet to produce a lift force are described in the specifications of co-pending patent applications Serial Nos. 323,582 and 323,581, now U. S. Patents No. 2,759,686 and No. 2,840,325, respectively. In another arrangement the propulsion means are arranged so that the propulsive jets are normally downwardly directed.

The invention may also be employed with advantage with other aircraft employing gas-turbine propulsion means, for instance with helicopters whereof the rotor is driven by a gas turbine for manoeuvring the helicopter in flight.

We claim:

1. An aircraft having gas turbine propulsion means including compressor means and a propulsive nozzle arrangement directed in the sense substantially at right angles to a plane which is horizontal in normal cruising flight of the aircraft, a pair of auxiliary jet nozzles spaced apart on the aircraft and directed in the same sense as one another and substantially at right angles to said plane thereby to produce mutually opposed turning moments on the aircraft about a given axis, means affording a supply of compressed air from said compressor means and connected to supply said pair of auxiliary jet nozzles simultaneously with compressed air, and control means to effect simultaneously a decrease in the supply to one of said pair of jet nozzles and an equal increase in the supply to the other jet nozzle, whereby the total supply to the nozzles is unchanged and the ratio in which the supply is divided between the nozzles is varied to vary the effective overall turning moment on the aircraft by said auxiliary jet nozzles.

2. An aircraft as claimed in claim 1, wherein said gas turbine propulsion means comprises a pair of gas turbine engines arranged in line with one another with their axes in said horizontal plane, the one gas turbine engine having a single propulsion nozzle directed downwardly with respect to said horizontal plane and the other gas turbine engine feeding a pair of propulsion nozzles disposed one on each side of said first propulsion nozzle and also directed downwardly with respect to said horizontal plane.

3. Jet aircraft having in combination turbo-jet propulsion means having a compressor and at least one downwardly-directed jet outlet affording sufficient thrust to sustain the aircraft by jet lift alone, and, for controlling the attitude of the aircraft when sustained by jet lift alone, control means comprising at least one pair of jet nozzles spaced apart about an axis which is substantially horizontal when the aircraft is level, means affording a supply of compressed air from said compressor means and connected to supply said pair of jet nozzles simultaneously with compressed air, and means to vary the ratio in which the supply from the compressor means is divided between said jet nozzles and thus to vary the effective overall turning moment exerted on the aircraft.

4. Jet aircraft having in combination turbo-jet propulsion means having a compressor and at least one downwardly-directed jet outlet affording sufficient thrust to sustain the aircraft by jet lift alone, and, for controlling the attitude of the aircraft when sustained by jet lift alone, control jet means comprising at least one pair of jet nozzles spaced apart on said aircraft and directed in the same sense substantially at right angles to a plane which is substantially horizontal in cruising flight of the aircraft thereby to produce mutually opposed turning moments on the aircraft about a given axis, means affording a supply of compressed air from said compressor means and connected to supply said pair of jet nozzles simultaneously with compressed air, and control means to vary the ratio in which the supply from the compressor means is divided between the jet nozzles and thus to vary the effective overall turning moment exerted on the aircraft.

5. Jet aircraft having in combination turbo-jet propulsion means having a compressor and at least one downwardly-directed jet outlet affording sufficient thrust to sustain the aircraft by jet lift alone, and, for controlling the attitude of the aircraft when sustained by jet lift alone, control means comprising at least one pair of jet nozzles spaced apart about an axis which is substantially horizontal when the aircraft is level, means affording a supply of compressed air from said compressor means and connected to supply said pair of jet nozzles simultaneously with compressed air, and means to effect simultaneously a decrease in the supply to one of said pair of jet nozzles and an equal increase in the supply to the other jet nozzle, whereby the total supply to the nozzles is unchanged and the ratio in which the supply is divided between the nozzles is varied to vary the effective overall turning moment on the aircraft.

6. Jet aircraft having in combination turbo-jet propulsion means having a compressor and at least one downwardly-directed jet outlet affording sufficient thrust to sustain the aircraft by jet lift alone, and, for controlling the attitude of the aircraft when sustained by jet lift alone, control jet means comprising at least one pair of jet nozzles spaced apart on said aircraft and directed in the same sense substantially at right angles to a plane which is substantially horizontal in cruising flight of the aircraft thereby to produce mutually opposed turning moments on the aircraft about a given axis, means affording a supply of compressed air from said compressor means and connected to supply said pair of jet nozzles simultaneously with compressed air, and control means to effect simultaneously a decrease in the supply to one of said pair of jet nozzles and an equal increase in the supply to the other jet nozzle, whereby the total supply to the nozzles is unchanged and the ratio in which the supply is divided between the nozzles is varied to vary the effective overall turning moment on the aircraft.

References Cited in the file of this patent

UNITED STATES PATENTS

| | | |
|---|---|---|
| 1,879,717 | Sikorsky | Sept. 27, 1932 |
| 2,422,744 | O'Neil | June 24, 1947 |
| 2,472,839 | Kramer | June 14, 1949 |
| 2,568,812 | Lee | Sept. 25, 1951 |

FOREIGN PATENTS

| | | |
|---|---|---|
| 597,261 | Great Britain | Jan. 21, 1948 |
| 610,143 | Great Britain | Oct. 12, 1948 |